United States Patent [19]

Stolzer

[11] Patent Number: 5,347,903
[45] Date of Patent: Sep. 20, 1994

[54] HORIZONTAL BANDSAW WITH AUTOMATIC TILT CONTROL

[75] Inventor: Armin Stolzer, Baden-Baden, Fed. Rep. of Germany

[73] Assignees: Keuro Besitz GmbH & Co.; EDV-Dienstleistungs KG, Achern-Gamshurst, Fed. Rep. of Germany

[21] Appl. No.: 125,015

[22] Filed: Sep. 21, 1993

[30] Foreign Application Priority Data

Oct. 24, 1992 [DE] Fed. Rep. of Germany ... 9214430[U]

[51] Int. Cl.⁵ .................................. B26D 1/46
[52] U.S. Cl. ....................... 83/796; 83/801; 83/812
[58] Field of Search ............... 83/798, 812, 811, 784, 83/797, 794, 796, 801

[56] References Cited

U.S. PATENT DOCUMENTS

| | | | |
|---|---|---|---|
| 2,549,236 | 4/1951 | Rathert et al. | 83/796 |
| 4,030,386 | 6/1977 | Poetzsch et al. | 83/811 X |
| 4,111,085 | 9/1978 | Johnson | 83/811 X |
| 4,478,120 | 10/1984 | Sugimoto | 83/796 X |
| 4,487,097 | 12/1984 | Hara et al. | 83/801 |
| 4,579,026 | 4/1986 | Tsune | 83/798 X |
| 4,805,500 | 2/1989 | Saito et al. | 83/796 X |

*Primary Examiner*—Richard K. Seidel
*Assistant Examiner*—Kenneth E. Peterson
*Attorney, Agent, or Firm*—Frishauf, Holtz, Goodman & Woodward

[57] ABSTRACT

A horizontal bandsaw is mounted in a tool carrier above a workpiece location. Before it starts cutting the bandsaw is tilted an angle between 3° and 10° and after the initial cut that angle is maintained during the rest of the cut until the intended depth of cut is reached or closely approached, when the saw tilt is removed as the structure containing the bandsaw is swung to orient the bandsaw horizontally. If the depth of cut is a complete cut through, the advantage of a minimum erosion of the center selvage of the workpiece support is assured. Mechanical limits are provided for the vertical displacement by tilt at one side of the workpiece and on that side one of the guides of the structure supporting the bandsaw has a hydraulic changeover control in which the angle of tilt is set by adjustable screw-stops which cooperate with stop plates mounted on the structure supporting the bandsaw.

9 Claims, 6 Drawing Sheets

HORIZONTAL BANDSAW WITH AUTOMATIC TILT CONTROL

This invention concerns a horizontal bandsaw having a machine base on a workpiece table of which a workpiece can be positioned, for example by clamping means. A tool carrier for the saw band is mounted on vertical guide elements disposed on both sides of the workpiece region. The tool carrier provides housing and supporting of a saw band operating in its cutting region with a straight-line cutting movement along a lower straight stretch. The moving saw band can be moved vertically by the tool carrier in the direction of the workpiece that is to be sawed, by means of the vertical guides and saw advancing means associated therewith and with the machine base. The saw band advancing means are optionally tiltable with respect to the machine base. The tool carrier is connected to every vertical guide by a movable guide element which is movable in a guide path of a vertical guide element.

Known horizontal bandsaws of the above mentioned kind, which find their application mainly as large machines for corresponding sawing work, the saw band in its cutting region runs parallel to the workpiece table and the tool carrier is advanced downward along the vertical guide paths from above in the direction of the workpiece. In that way it is possible to carry out so-called notching, i.e. cutting out smaller blocks from a larger block, in which the cut within the block is interrupted at a particular location. It is also advantageous in such machines to permit only slight penetration into the center selvage located in the workpiece table in order to make a complete separation of the blocks being cut out. This type of saw construction makes it possible to utilize effectively the work region which the workpiece table makes available for the material to be worked on.

There is the disadvantage, however, that in cutting the material, especially in the machining of rectangular material, it is necessary to penetrate the surface portion of the workpiece very slowly, because the cutting location can have a considerable length, corresponding to the size of the machine, so that the risk of an untrue cut is present. This occurs particularly in the machining of strongly oxidized metal material, in cutting through which the sawband must first be exposed to strong wear before it actually gets to cutting.

Bandsaws with an inclined upper part are also known. In these, particularly in cutting rectangular material there is only a short initial cut length, so that even an oxidized layer is more quickly cut through, thus going easy on the saw band. Nevertheless these machines evidently do not make possible any notching cuts of the above mentioned kind. Furthermore, with an inclined position of the saw, some of the work region of the tool carrier is not available, so that with an inclined position from 3° to 10° there is a considerable loss of cutting length.

SUMMARY OF THE INVENTION

It is an object of the present invention to combine the advantages of a horizontally mounted tool carrier with those of an inclined tool carrier, whereby initial cutting of the workpiece material is performed particularly well even in the presence of an oxidized layer and at the end of the cutting operation the center selvage of the workpiece table is only cut into very slightly, thus obtaining an advantageously short operation time in cutting rectangular material while nevertheless greatly limiting the loss of cutting region.

Briefly, the tool carrier is mounted so as to swing about an axis perpendicular to the direction of movement of the saw band in the cutting region by a pivot joint at one of the guide elements, while at another guide element the tool carrier is shiftable in a vertical plane within limits and is also tiltable about a horizontal axis. By the operation of the means for advancing the saw for cutting, at the beginning of the sawing operation, the tool carrier is inclined with respect to the horizontal to an extent determined by a stop element and at the end of the sawing operation the tool carrier is returned to the horizontal position as a result, likewise, of another stop element.

By these provisions it is also possible to set the tool carrier obliquely with respect to the strictly horizontal direction at an angle which is usefully in the region from 3° to 10°, without the necessity of action by special modifications or additions of or to the vertical guides of the tool carrier. All that is needed is a slight modification of guiding elements which are in any case present. Then, the change between horizontal position and oblique position of the tool carrier is essentially performed by the usual advancing means for the bandsaw, which is normally provided, at each side of the workpiece, with a hydraulic cylinder and piston assembly located adjacent to the vertical guide. Thus when, beginning with a horizontal setting of the tool carrier, one of the two hydraulic advance means is allowed to operate while the other is stationary, an inclined position of the tool carrier is produced. When at the end of the sawing operation the tool carrier is to be put back into horizontal position, the hydraulic advancing aggregate which at the beginning was allowed to operate alone is now stopped while the other hydraulic aggregate continues in movement. The control means necessary for the above-described operation, including the necessary pressure and flow changes of the oil stream of the individual hydraulic cylinder-piston aggregates operating alone or in step with each other, are all devices that are well known and commercially available.

In the above described method of operation an oblique initial cut of the workpiece material is performed at the beginning of the sawing operation, with all the advantages obtainable as above described and then this oblique position of the saw band provides a saving of time when it is used for essentially completing the cutting operation. Only at the end of the cutting operation is it then useful to put the tool carrier in a horizontal position, mainly for the purpose of producing only a small incision in the center selvage of the workpiece table. This applies also for the above mentioned notching cuts, thus for the interruption of the sawing operation at any desired stage within the workpiece cross section.

It is evident that the inclination shift of the tool carrier is essentially possible with the use of the already present saw advance means, without the necessity of introducing into the construction any additional instabilities regarding the guiding of the tool carrier.

The above mentioned stop elements are provided in order to define the two end positions of the tool carrier. These can be constituted as end-switches or the like. It is advantageous, however, that in the direction of the guide path, next to one guide element another guide element should be provided for the tool carrier and that the tool carrier should be displaceable within limits in a vertical plane at the additional guide element and should be swingable about the horizontal axis which is at right angles to the operating direction of the saw band and, finally, that positioning means engaging the additional guide element and the tool carrier for setting the inclination of the tool carrier should be between limits set by stops. The positioning means can thus be a cylinder-piston aggregate engaging the tool carrier at one side and at the other side engaging the additional guide element.

With this manner of construction it is also possible to control or support the repositioning of the tool carrier, by activating the cylinder-piston aggregates located at the additional guide element which also control the shifts, coordinated with the saw-advance means, between horizontal and oblique position in a defined way so that in each case the stop provided for the position of the tool carrier is surely met and that the tool carrier then is held in its position during the entire work stroke that is contemplated.

It can in practice be foreseen that one guide element would be disposed in the lower region of the tool carrier and that the other guiding element would be disposed above it.

Finally, the stops can be provided by adjusting screws which are insertable and lockable in the additional guide element and operating in parallel with the positioning means and of course cooperating with the stop-receiving surfaces of the tool carrier. To the same extent, of course, end switches or the like can also come into consideration as stopping means.

BRIEF DESCRIPTION OF THE DRAWINGS

The invention is further described by way of example with reference to the annexed drawings, in which.

DESCRIPTION OF THE ILLUSTRATED EMBODIMENT

Figure 1:
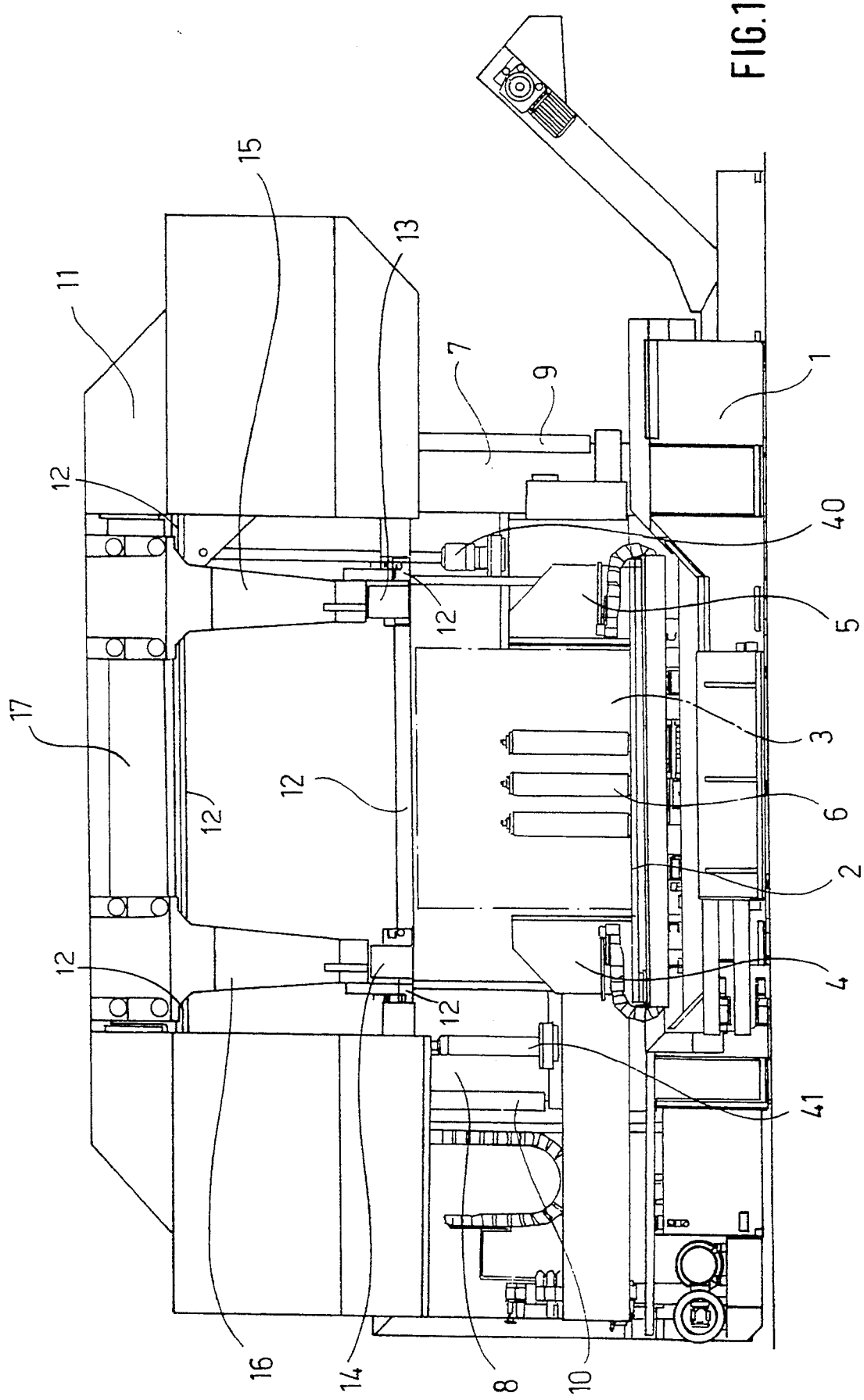
FIG. 1 is a front view of a horizontal bandsaw.

FIG. 1 shows a horizontal bandsaw in front view. This sawing machine has a machine base 1 and a workpiece table 2, on which a workpiece 3 can be clamped between clamp plates 4, 5. For supporting the workpiece 3 perpendicular to the plane of the drawing, particularly in the case of heavy workpieces, additional means 6 are provided.

Figure 2:
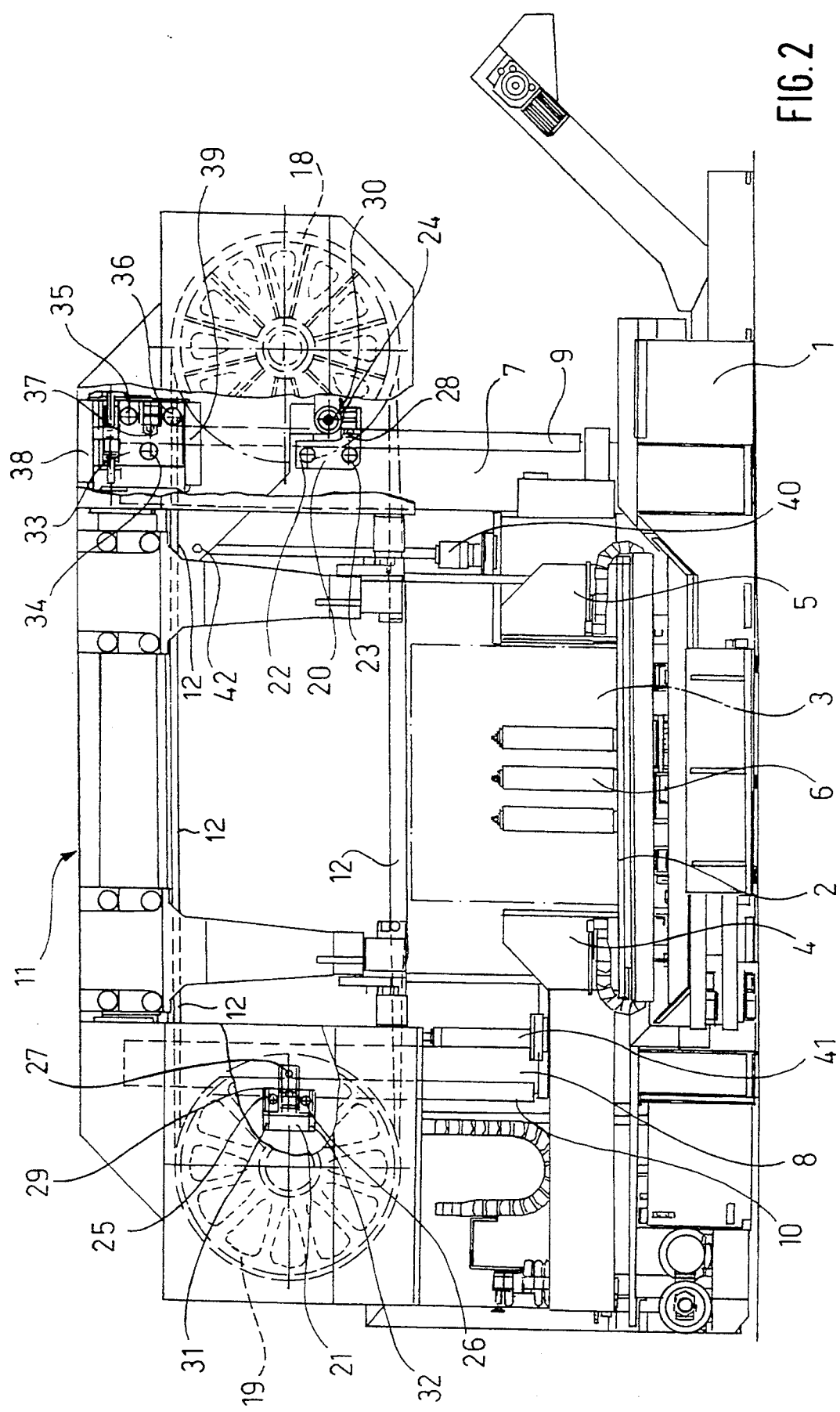
FIG. 2 is another front view of the saw of FIG. 1, partly cut away.

On both sides of the workpiece region vertical guide columns 7, 8 extend from the machine base 1 and have guide rails 9 and 10 above which a tool carrier 11 is movable in an essentially vertical direction, so that the saw band 12 can run in its loop in the tool carrier 11 in such a way that the lower length of the saw band can make a cut from above into the workpiece 3 and cut it apart, as is evident in FIGS. 1 and 2. The saw band is swung in the vertical cut plane by guides 13 and 14 on opposite sides of the workpiece 3. The guides 13 and 14 are seated on guide arms 15 and 16 which can be shifted horizontally on a path 17 and can be set and held fast on opposite sides of the horizontal cross section of the workpiece 3.

FIG. 2 shows the subject matter of FIG. 1 in partly cut away form. There are also shown the reversing wheels 18 and 19 for the saw band in the tool carrier 11.

It is also visible in FIG. 2 that the tool carrier 11 can be moved vertically on the guide columns 7 and 8 with directional control by guide elements 20 and 21 which support the tool carrier 11 parallel to the plane of FIG. 2 by means of guide rollers 22, 23 and 24 on one side and 25, 26 and 27 at the other side, while support perpendicular to the plane of the drawing is provided by rollers 28 and 29. In order to equalize the play in the guidance one of the guide rollers of the guide elements 20, 21 can usefully be provided as an eccentrically mounted roller.

Figure 7:
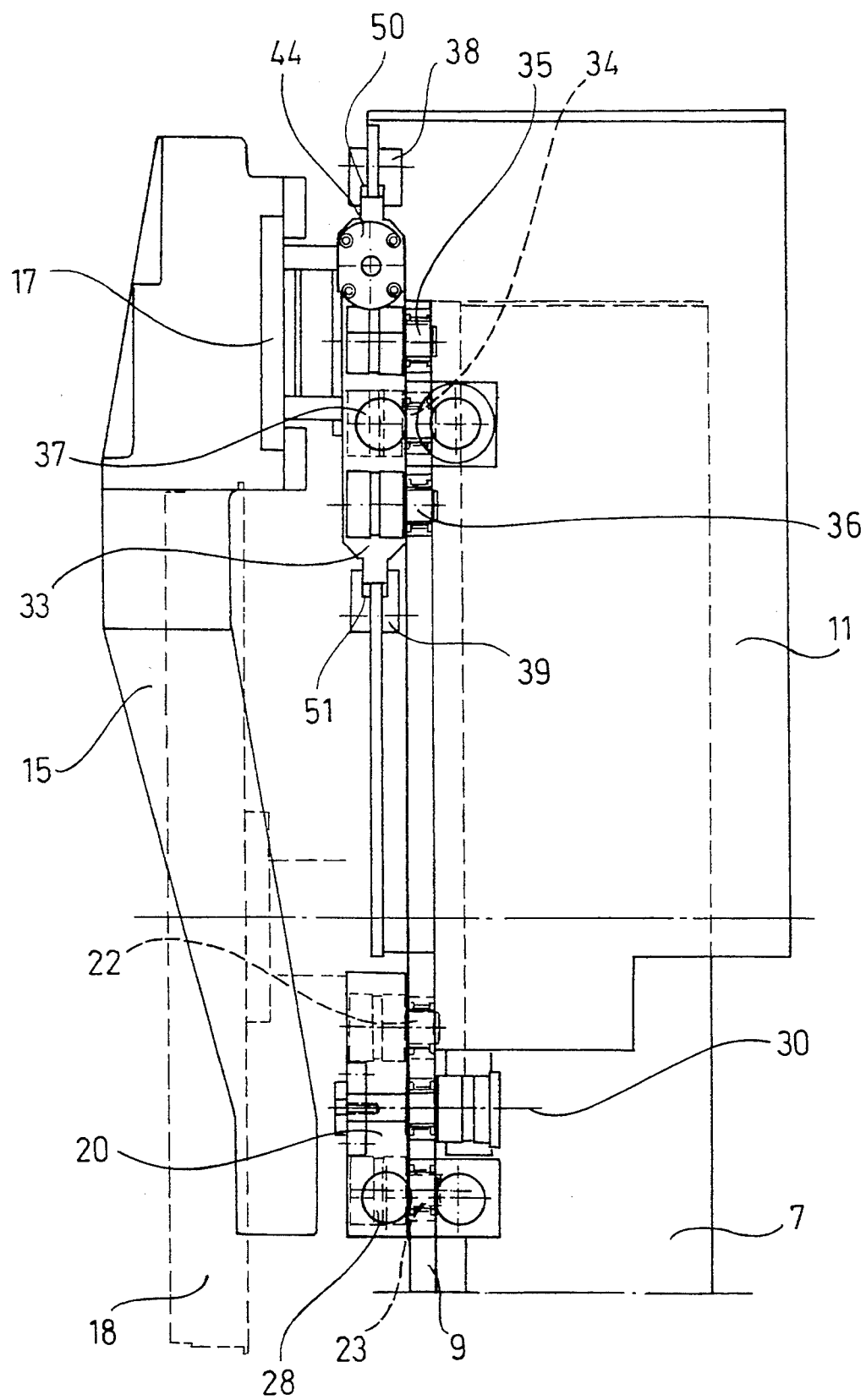
FIG. 7 is a side view of the tool carrier seen from the right with reference to FIGS. 1 and 2.

The tool carrier 11 is pivoted at the guide element 20 for swinging about an axis 30, while at the guide element 21 it is vertically and horizontally movable within limits over guide paths 31 and 32 and is also mounted tiltably within certain vertical limits. Reference is made to FIG. 7 in the description thereof for the provision of such limits.

Above the guide element 20 an additional guide element 33 is movable along the guide column 7 and its guide rail 9. The guide element 33 moves over supporting rollers 34, 35 and 36 parallel to the plane of the drawing and over a support roller 37 supporting the guide element 33 perpendicular to the plane of the drawing. The tool carrier 11 supports itself against the guide element 33 over guide paths 38 and 39 perpendicular to the plane of the drawing while it is movable in a vertical plane at the guide element 30.

The vertical movement of the tool carrier 11 is now provided by the hydraulic cylinder-piston aggregates 40 and 41 respectively disposed next to the guide columns 7 and 8. These hydraulic cylinder-piston aggregates connected at one end to the machine base 1 and at the other end to the tool carrier 11, as well as the connection to the tool carrier 11, can be made swingable, as is evident in FIG. 2 for the cylinder-piston aggregate 40 at 42.

With this construction there is now the possibility to set tool carrier 11 in an oblique position with respect to the strictly horizontal positioning that is visible in FIGS. 1 and 2, the oblique position being for the purpose of initial cutting of the workpiece 3 and then allowing the main portion of the sawing operation to proceed in a more favorable way. For this purpose an oblique setting from 3° to 10° is particularly suitable.

In order to reach the oblique position of the tool carrier, before the initial cutting of the workpiece 3 the cylinder-piston aggregate 40 is put in motion while the cylinder-piston aggregate 41 remains stationary. The tool carrier 11 is then somewhat lowered at the right hand side of FIGS. 1 and 2 and is swung about the axis 30, so that it carries out corresponding displacement and swing movements with respect to the guide elements 21 and 33. When the desired oblique position is reached, the cylinder-piston aggregate 41 is also set into operation, after which during the sawing operation both cylinder-piston aggregates operate at the same speed to move the tool carrier 11 from above downwards at the same speed at both ends and thereby advance the active saw band 12 through the workpiece 3.

Only near the end of the cutting operation, normally shortly before reaching the workpiece table 2, or when the workpiece material 3 is intended to be only partly sawed through—in any case before reaching the intended cut depth—the cylinder-piston aggregate 40 is stopped and only the cylinder-piston aggregate 41 continues to operate, but only until the saw band 12 has again reached the exact horizontal position.

Figure 3:
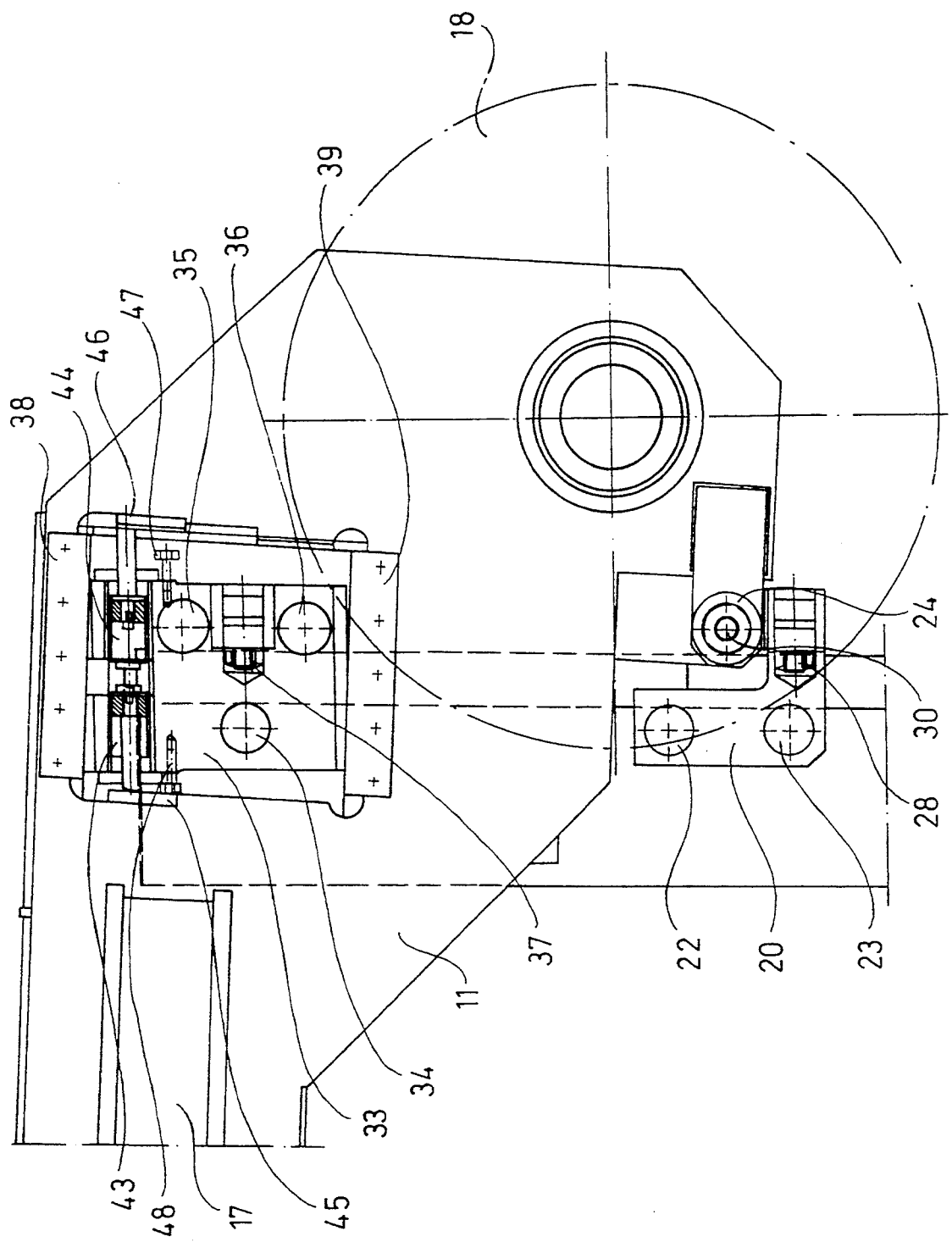
FIG. 3 is a magnified partial front view of the right hand portion of the tool carrier shown in FIGS. 1 and 2, shown in a first swung position.

In order to fix the swung positions or to support the swing movements, additional means are provided at the guide element 33 which are now explained with reference to FIGS. 3 and 4, which show on a magnified and more opening representation the right hand portion of the tool carrier 11 of FIGS. 1 and 2. FIG. 3 shows the swung position of the tool carrier 11, while FIG. 4 shows the horizontal return position of the tool carrier 11 at the end of the cutting operation.

Figure 4:
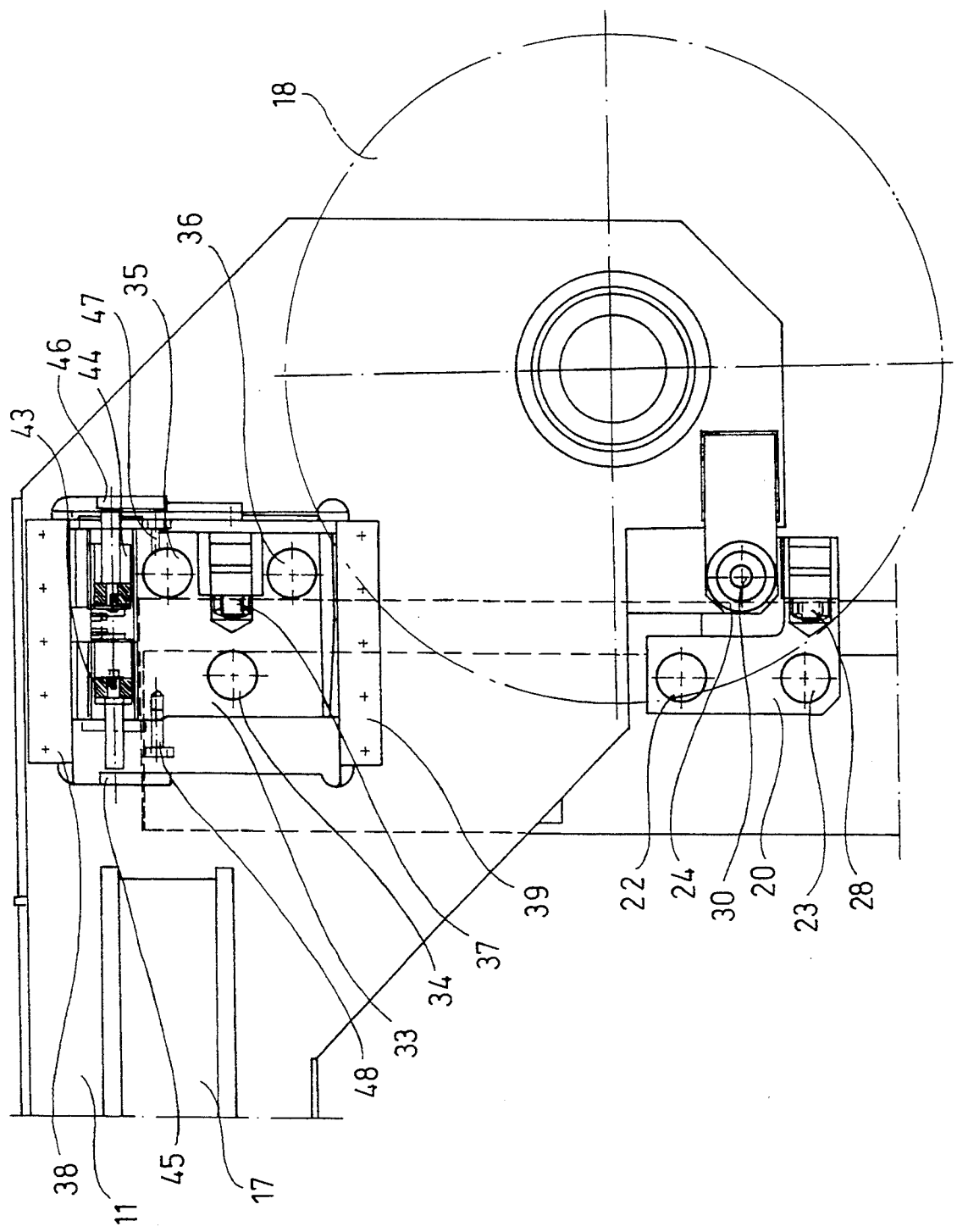
FIG. 4 shows the subject matter of FIG. 3 is another swung position.

As can be seen in FIGS. 3 and 4, there are affixed to the guide element 33 the essentially horizontally operating cylinder-piston aggregates 43 and 44, which with their piston rods bear against the stop pieces 45 and 46 of the tool carrier 11. Whenever the tool carrier 11 is swung away from the horizontal position into an oblique position, the cylinder-piston aggregate 44 is immediately activated by oil pressure, so that the swing movement of the tool carrier 11 is supported in the position shown in FIG. 3. The cylinder-piston aggregate 43 in the meanwhile is without pressure. Means other than hydraulic means may be used for this operation and in this connection the use of solenoids and armatures deserves consideration.

The stop screws 47 and 48 serve to provide exact positioning of the oblique setting of the tool carrier 11. The stop screw 48 sets the stroke for the cylinder-piston aggregate 44, while the stop screw 47 sets the stroke for the cylinder-piston aggregate 43. The stop screws 47 and 48 respectively go against the affixed limit plates 45 and 46.

FIG. 3 shows in the above described manner the arresting of the oblique setting position of the tool carrier 11. In contrast thereto FIG. 4 shows the horizontal position of the tool carrier 11 which is to be provided towards the end of the sawing operation. In the latter operation the cylinder-piston aggregate 43 is correspondingly provided with hydraulic pressure and the stop screw 47 comes against the limit plate 46 of the tool carrier 11.

In accordance with the two relatively swung positions of the tool carrier 11, that tool carrier must change its position also at the guide element 21. This effect is shown in FIGS. 5 and 6, respectively consistent to FIGS. 3 and 4, although FIGS. 5 and 6 show from behind the left side of the tool carrier 11 with reference to FIGS. 1 and 2.

Figure 6:
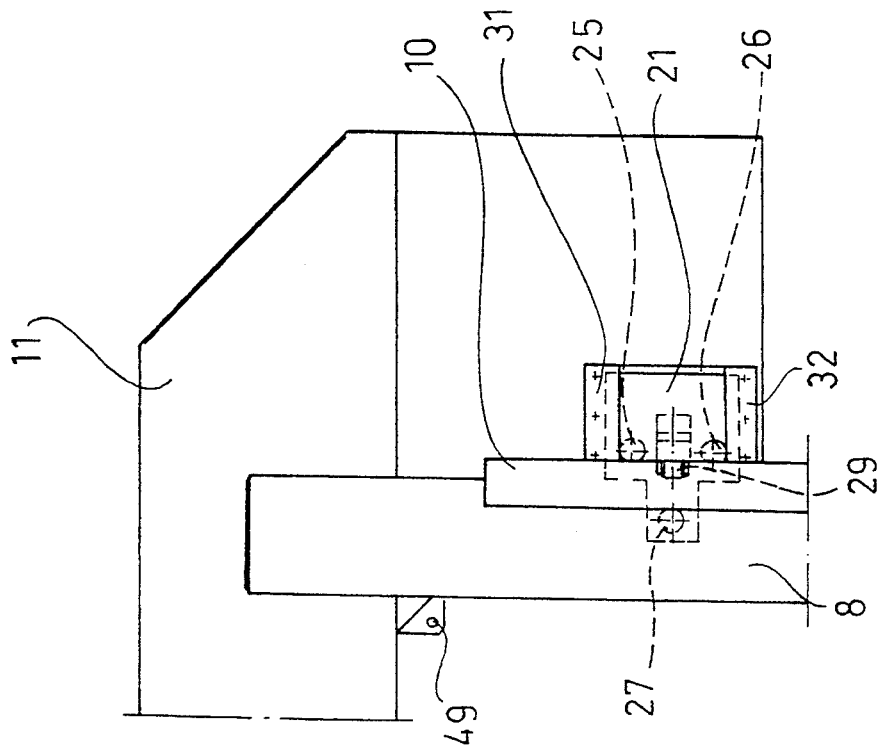
FIGS. 5 and 6 are partial views from the back of the left side of the tool carrier shown in FIGS. 1 and 2, respectively in a first and in a second swung position corresponding to FIGS. 3 and 4.
Figure 5:
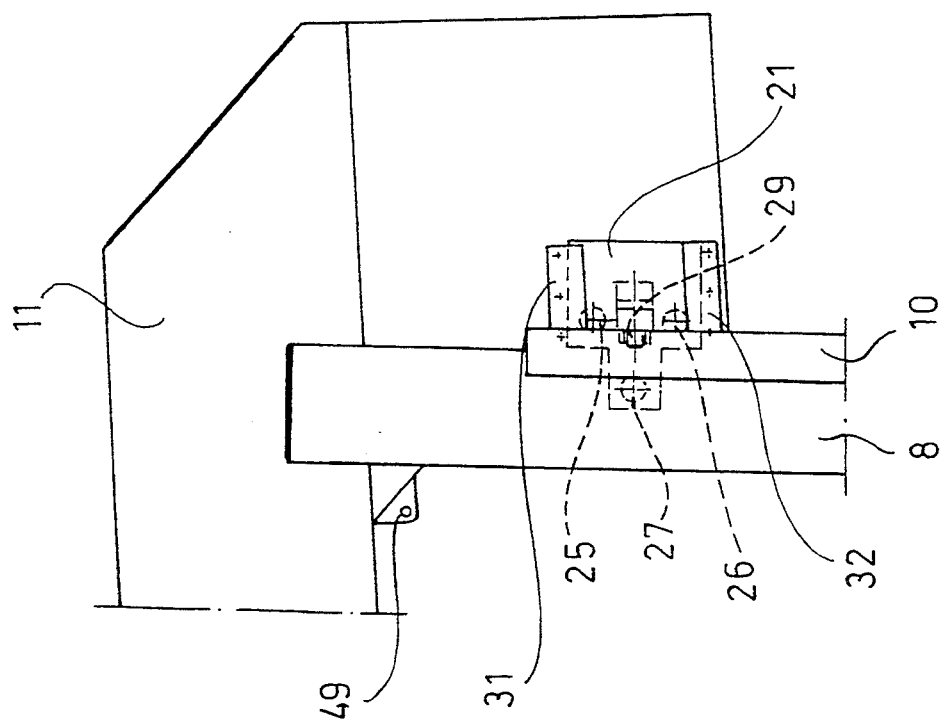

In FIG. 5 the tool carrier 11 is swung at the guide element 21 as can be seen in the guide paths 31 and 32, whereas in FIG. 6 it has been brought into the horizontal position the corresponding movement relative to the guide element 21. FIGS. 5 and 6 also show 49 the swingable articulation of the cylinder-piston aggregate 41 and its attachment to the tool carrier 11.

To complete the illustration, FIG. 7 shows the tool carrier 11 seen from the right with reference to FIGS. 1 and 2. The corresponding individual parts are shown with the numbers used in other figures, so that a further description of these details with regard to FIG. 7 is not necessary. It should however be noted that the tool carrier 21 is movable over its guide paths 38 and 39, as shown, only in the manner permitted by the limits 50 and 51 which are set for the guide element 33, so that in any case the tool carrier moves the guide element 33. The same applies to the connection between the tool carrier 11 and the guide element 21, so that it is not necessary to illustrate that and describe it.

The bandsaw machine here described and illustrated also provides the possibility, especially in heavy machine embodiments of the horizontal construction type, for the saw band to provide during the initial cut and the main cutting operation an oblique position with respect to the workpiece material without the necessity of keeping this oblique position for the end portion of the cutting operation, so that during the cutting operation the advantages of the oblique position of the saw band with respect to the workpiece material can be obtained, while for the end of the cutting operation the advantages of a purely horizontal construction are present.

It is evident from the above description regarding the activation of the various cylinder-piston aggregates that the corresponding hydraulic control means are present, although these are not shown in the drawings and that as is conventional with such controls, that an electronic monitoring of the desired ten positions the contemplated sawing operation will be provided to assure that the controls are accurate. In other words, showing in the drawing of the cylinder and piston aggregates and their connections to parts of the machine represents also the presence of a complete hydraulic system, its source of oil pressure and all necessary controls and monitoring devices. Such control means for the cylinder-piston aggregates are in general conventional and commercially available.

Although the invention has been described with reference to a particular illustrative embodiment, it will be recognized that modifications and variations are possible within the inventive concept.

What is claimed is:

1. A horizontal bandsaw having a machine base, a workpiece table on said base with means for positioning a workpiece on said table for being sawed, a tool carrier unit housing a horizontal bandsaw having a saw band which is run on a lower straight stretch, said bandsaw being of a design for rectilinearly cutting a workpiece positioned on said workpiece table, said tool carrier being mounted above said workpiece table for vertical movement, guided by vertical guide rails on opposite sides of said workpiece table and controlled by at least one advancing vertical displacement means for said bandsaw affixed to said machine base and having movable members affixed to said tool carrier respectively near said vertical guide rails, said vertical displacement means being optionally operable for tilting the lower straight stretch out of a horizontal plane, and said tool carrier being connected to each said guide rail by a guide element which is movable on said guide rail, and wherein said tool carrier (11) is pivoted at a first guide element (20) of said guide elements for swinging about a horizontal axis which is perpendicular to a cutting plane of the saw band (12) of said bandsaw and is likewise pivoted at a second guide element (21) of said guide elements about a horizontal axis which is perpendicular to said cutting plane of the saw band, and first (48) and second (47) stop members are provided whereby during operation of said vertical displacement means (40, 41) said tool carrier can, at the beginning of a sawing operation, be lowered with the bandsaw cutting at an oblique cutting angle determined by said first stop member (48) and at the end of a sawing operation said tool carrier can be lowered with the bandsaw cutting with a horizontal cutting movement by being brought into abutment with said second stop member (47).

2. The horizontal bandsaw of claim 1, wherein
said first guide element (20) is movable on a vertical path member (9) and on a side of said first guide element which is adjacent to said vertical path member, a third guide element (33) for said tool carrier (11) is provided, wherein at said third guide element (33) said tool carrier (11) is displaceable vertically between mechanical limits (50, 51) and is pivotably mounted for swinging about a horizontal axis which is at right angles to movement direction of cutting operation of said bandsaw, and wherein said third guide element (33) has position changeover means (43, 44) engaging with said third guide element (33) and with said tool carrier (11) for adjustably setting the oblique position of said tool carrier relative to its horizontal position within defined limits imposed by said stop members (47, 48) mounted in stationary position on one of said third guide element and tool carrier engaged by said position changeover means.

3. The horizontal bandsaw of claim 2, wherein said first guide element (20) is located in a lower part of said tool carrier (11) and said third guide element is located above said first guide element.

4. The horizontal bandsaw of claim 3, wherein said stop members (47, 48) are mounted in stationary position on said third guide element (33) and comprise parallel-operating, insertable and fixable in position, adjustable screw-stops of said third guide element (33), which respectively cooperate with stop plates (45, 46) mounted on said tool carrier (11) to limit the angle of swing of said tool carrier out of a horizontal position thereof.

5. The horizontal bandsaw of claim 2, wherein said stop members (47, 48) are mounted in stationary position on said third guide element (33) and comprise parallel-operating, insertable and fixable in position, adjustable screw-stops of said third guide element (33), which respectively cooperate with stop plates (45, 46) mounted on said tool carrier (11) to limit the angle of swing of said tool carrier out of a horizontal position thereof.

6. The horizontal bandsaw of claim 2, wherein said position changeover means (43, 44) engaging said third guide element (33) and said tool carrier (11) comprises hydraulically operable cylinder and piston devices.

7. The horizontal bandsaw of claim 6, wherein said first guide element (20) is located in a lower part of said tool carrier (11) and said third guide element is located above said first guide element.

8. The horizontal bandsaw of claim 7, wherein said stop members (47, 48) are mounted in stationary position on said third guide element (33) and comprise parallel-operating, insertable and fixable in position, adjustable screw-stops of said third guide element (33), which respectively cooperate with stop plates (45, 46) mounted on said tool carrier (11) to limit the angle of swing of said tool carrier out of a horizontal position thereof.

9. The horizontal bandsaw of claim 6, wherein said stop members (47, 48) are mounted in stationary position on said third guide element (33) and comprise parallel-operating, insertable and fixable in position, adjustable screw-stops of said third guide element (33), which respectively cooperate with stop plates (45, 46) mounted on said tool carrier (11) to limit the angle of swing of said tool carrier out of a horizontal position thereof.

* * * * *